G. W. Parker,
Clothes Pin Machine.
No 429.
Reissued Feb. 11, 1857.
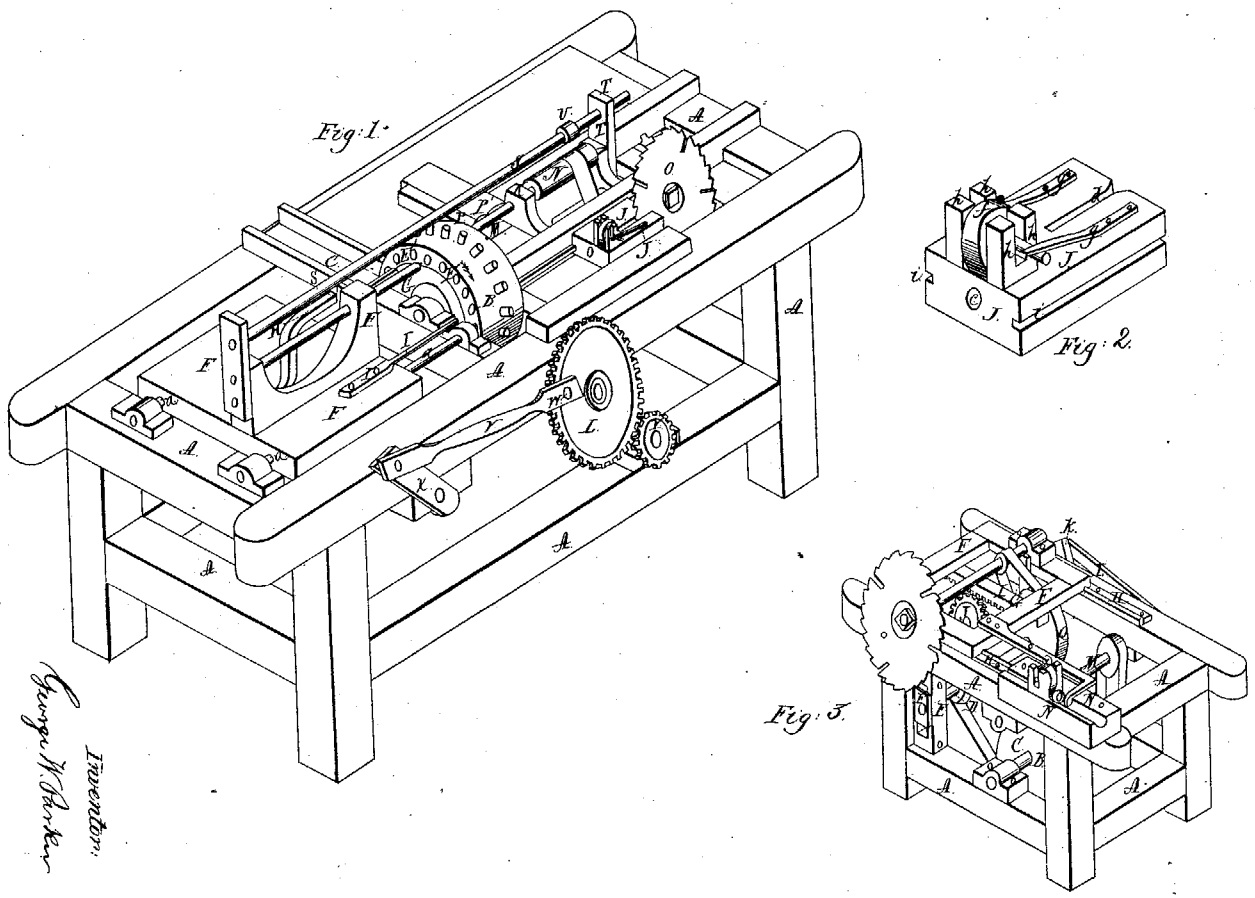
Inventor:
George W. Parker
AM. PHOTO-LITHO. CO. N.Y. (OSBORNE'S PROCESS)

UNITED STATES PATENT OFFICE.

GEORGE W. PARKER, OF FITZWILLIAM, NEW HAMPSHIRE.

IMPROVED MACHINE FOR MAKING CLOTHES-PINS.

Specification forming part of Letters Patent No. 14,466, dated March 18, 1856; Reissue No. 429, dated February 17, 1857.

*To all whom it may concern:*

Be it known that I, GEORGE W. PARKER, of Fitzwilliam, in the county of Cheshire and State of New Hampshire, have invented a new and useful Machine for Making Clothes-Pins, Pail-Handles, and other Articles; and I do hereby declare that the following is a full and exact description of the construction and operation of the same, reference being had to the annexed drawings, making part of this specification, in which the machine is shown in perspective.

This invention consists in the employment of a wheel or cylinder with holes near its circumference, or of tubes placed near the circumference of a wheel; of a sliding or reciprocating lathe and tail-block; of movable and stationary cutters or chisels; of a saw or bit, according to the article being manufactured; of a holder to hold the article while being sawed or bored; of a feed-board or hopper; of punches to force the pieces into the holes and into the holder, and the other parts necessary to the operation of the several parts above mentioned.

The several parts of the machine are referred to by letters.

A A A is the frame that supports the several parts.

B is the wheel or cylinder.

E E E are the holes in wheel B into which the pieces of wood to be operated on are fed, and in which they are retained and moved forward to the right position for the action of the lathe, and also to be forced into the holder to be sawed or bored.

D D D are pins fixed in the circumference of the wheel B, and work in a grooved or worm wheel beneath the wheel B, and by which means the wheel B is kept in an alternate state of motion and rest. Any other contrivance to effect the same purpose may be used. The wheel B works in proper bearings, and rotates in the direction indicated by the arrow. K is the common lathe, placed on ways at right angles to the wheel B, and has a reciprocating motion to and from the wheel B.

M is the mandrel, and N the pulley. The lathe K is so placed that the axis of the mandrel M corresponds exactly with the axis of the holes E E E as they come opposite to it. The lathe K is drawn toward the wheel B by a string or weight strong enough so that the spur of the mandrel M will seize upon the stick so firmly as to whirl it and sustain the action of the cutters or chisels, but is not held so strong but what it is readily forced back by the tail-block, or the lathe may be fastened to the tail-block and move with it by means of a rod passing through the axis of wheel B. In this case the mandrel of the tail-block is made to move a sufficient distance forward to clamp the piece of wood firmly between the two mandrels of the lathe and tail-block.

F is the tail-block, and G is the mandrel, having a spur on its end towards the wheel B. The axis of the mandrel G corresponds exactly with the axis of the holes E E E the same as the mandrel M of the lathe K, and the mandrels G and M and the holes E E are exactly in a line with one another. The tail-block F has a reciprocating motion to and from the wheel B and at right angles to it, and slides on rods *a a*, or on ways. Motion is given to the tail-block F by a cog-wheel working in a rack-gear, which is fastened to the under side of the tail-block, and this rack-gear and wheel are so arranged that when the tail-block is nearest the wheel B the rack-gear is thrown out of connection with the gear-wheel, and the tail-block and lathe remain stationary an instant, so that the chisels have time to operate. The gear-wheel is fastened to the shaft to which the arm X is fastened, and receives motion by means of the arm X, being connected by the sweep V to the crank-pin W in wheel L, or any other contrivance may be used which will give the proper motion to the tail-block. The punches are attached to the tail-block and move with it, or they may be connected with other parts of the machine that will give them the right motion. The punch H is to push the square pieces from the feed-board into the holes E E, and the punch I is to force the pieces into the holder J to be sawed or bored. The holder J slides or vibrates to and from the saw or bit between the wheel B and the saw or bit. It has a hole in it, through which the pieces are forced in a direction toward the saw or bit, and the end of the holder toward the saw is slotted to admit the saw as the holder carries the pin up to the saw to be sawed. A wheel pressed down by springs, or any other suitable means, may be used to hold the piece firmly in its place while it is being sawed or bored. This holder is shown more distinctly by itself in the drawings, Figure 2.

J is the body of the holder.

*c* is the hole in it and into which the pieces are forced.

*d* is the slot to admit the saw.

*f* is the wheel to hold the pieces in hole *c* while being sawed or bored.

*g g* are the springs to press the wheel down.

*h h* are standards to keep the wheel in its place. Any other contrivance may be used that will hold the pieces in the hole *c*. The standards are slotted, to allow the wheel to move when a piece is forced into the hole *c* under it. *i i* are slots for it to work on the ways. The holder J receives motion from the shaft to which the arm X is fastened by means of a sweep connecting it with an arm on this shaft.

O is the saw; or if an article is being made that requires to be bored instead of sawed, a bit is put in the place of the saw.

P P′ are the chisels, made of the right form to shape the article made. P is stationary, and P′ is movable, and is connected to the other parts in any manner to give it a motion at the right time.

C is the feed-board on which the square pieces are placed to be fed into the holes E E.

S is a rod extending across from the tail-block (to which it is permanently fastened) to the lathe, and plays a short distance through a hole in piece T, which is permanently fastened to the lathe. The object of this rod is to move the lathe out of the way of the chisel in case no stick should be between the mandrels G and M, or the stick while being turned should split or break. In these cases the collar V on rod S strikes the piece T and moves the lathe out of the way. The pulley on the lathe should be a long one, so as to allow the belt to slip as the lathe moves back and forth. The lathe is driven by a pulley directly beneath and parallel with it. On the same shaft and at the farther end of the machine, as shown in the drawings, is the driving-pulley for the whole machine. This shaft is connected to the shaft on which the small gear-wheel Y is fastened by means of bevel-gears, and on the other end of the shaft to which the wheel Y is fastened is the pulley to drive the saw. The bit would be driven by the pulley that drives the lathe. The wheel Y working in the gear-wheel L, motion is thereby given to the several parts that have been described.

The operation of the machine is as follows: The pieces of wood are placed upon the feed-board and pushed to the end of it nearest to the wheel B. The feed-board C is so placed that the holes E E, as the wheel B rotates, come into the right position for the pieces to be pushed into the holes E E by the punch H as it is moved forward by the tail-block F, to which it is attached. The pieces remain in the holes, and are carried forward as the wheel B rotates until they arrive between the spurs of the lathe and tail-block. The tail-block F moves forward, and the mandrel G of the tail-block forces the piece upon the spur of the mandrel of the lathe, which stands close to the other end of the hole. The spur seizes the piece and causes it to revolve rapidly in the hole. As the tail-block moves forward the piece is carried along out of the hole and by the first and stationary cutter P, which rounds it. The lathe then remains stationary an instant and the second cutter moves up and shapes and finishes turning it. The tail-block then moves back and the lathe follows, being drawn by the spring or weight attached to it, and the piece is carried back and left in the same hole from which it was taken, the wheel all this time remaining stationary. The wheel B now rotates and moves the piece out from between the spurs, and the next hole, containing a new piece, comes into line with the spurs of the tail-block and lathe, when the tail-block again moves forward and the same operation is gone through with as before. The pieces after being turned are carried forward until they come into line with the hole in carriage J and the punch I. The punch I moves forward and forces the pieces one after another as they are presented into the hole C in holder J, which carries them forward to be sawed or bored. As a new piece is forced into the holder it forces the piece already in the holder out, and it drops between the holder and saw or bit, and is conveyed out of the way by a spout or any other suitable contrivance. This finishes the operation.

The following is a description of that part of the machine that saws or bores, showing a different arrangement of the saw or bit and the holder from that which has already been described, wherein the saw or bit moves to and from the holder, instead of the holder moving to and from the saw or bit, this being the principal difference, the holder being essentially the same in both cases. This arrangement is shown in the drawings, Fig. 3, which also show the connection of this part with the other necessary machinery so as to be operated by itself disconnected with the turning part; also the operation which I have described of the holder moving to and from the saw or bit may be connected in a similar manner with machinery to be operated by itself. The several parts are referred to by letters.

Fig. 3, A A A is the frame to support the several parts.

N is the holder.

P is the saw, which is supported by the frame F. The frame F slides on ways H H, carrying the saw to and from the holder N. The saw is revolved by means of the belt from pulley Q on shaft D, and shaft D is driven by shaft B by means of the pulleys and belt.

B is the driving-shaft for the whole machine, and on its farther end, as shown in the drawings, is the driving-pulley.

I is a rock-gear fastened to the frame F.

J is a gear-wheel, which works in the rack-gear.

K is an arm fastened to the end of the same shaft on which the gear-wheel J is fastened.

L is a sweep connecting the arm K with a crank on the end of the shaft M, but the crank is not shown in the drawings, and the shaft M is driven from the shaft B.

O is an arm or punch, which is fastened to the frame F, and the end of it plays in the semicircular hollow in the holder N. The shaft D runs in boxes, which work in ways a short distance up and down, as shown at E, and these boxes are connected to the frame F by straps or rods, so that as the frame F moves backward and forward the shaft D and the saw-arbor are kept exactly the same distance apart all the time, so that the belt which drives the saw will be always tight. One of these straps is seen at G.

The operation is as follows: The crank on shaft M, as it revolves by means of the sweep L and arm K, rocks the gear-wheel J back and forth, and this gear-wheel J working in the rack-gear I, motion is thereby given to frame F, which carries the saw to and from the holder. The movement of the saw forward carries the end of the arm O out of the hollow in the holder and leaves it clear. A piece being now dropped in the hollow on the return of the punch, the piece is forced into the holder. As the saw moves forward into the slot the piece is sawed, and another piece being dropped into the hollow when the saw moves back, the punch forces this piece into the holder and this piece forces the one already in the holder out, and it drops between the holder and saw or bit. This finishes the operation.

What I claim as my invention, and desire to secure by Letters Patent, is—

1. The use of holes in a wheel, or of tubes secured to a wheel, and into which the pieces of wood are fed, and are thus retained in and moved forward to the right position to be acted on by the lathe saw or bit.

2. The sliding or vibrating lathe and tail-block, whereby the pieces of wood to be turned are carried forward to the action of the cutters or chisels.

3. The cutters or chisels in combination with the lathe.

4. A holder essentially the same as shown and described to hold the pieces while being sawed or bored, the succeeding piece forcing the preceding one out of the holder and it drops between the holder and saw or bit, and whether the holder be movable or stationary, the saw or bit being made to move to and from the holder, or the holder be made to move to and from the saw or bit.

5. A saw or bit, either movable or stationary, in combination with the holder.

6. A punch or its equivalent to force the pieces into the holder.

GEORGE W. PARKER.

Witnesses:

A. A. PARKER,

D. C. BISSELL.